United States Patent
Kakishima et al.

(10) Patent No.: US 9,391,682 B2
(45) Date of Patent: Jul. 12, 2016

(54) USER EQUIPMENT AND BASE STATION

(71) Applicant: NTT DOCOMO, INC., Tokyo (JP)

(72) Inventors: Yuichi Kakishima, Tokyo (JP); Satoshi Nagata, Tokyo (JP); Anass Benjebbour, Tokyo (JP); Xiang Yun, Beijing (CN); Yu Jiang, Beijing (CN); Lan Chen, Beijing (CN); Ozgun Bursalioglu, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/771,219

(22) PCT Filed: Feb. 18, 2014

(86) PCT No.: PCT/JP2014/053733
§ 371 (c)(1),
(2) Date: Aug. 28, 2015

(87) PCT Pub. No.: WO2014/136563
PCT Pub. Date: Sep. 12, 2014

(65) Prior Publication Data
US 2016/0013849 A1    Jan. 14, 2016

(30) Foreign Application Priority Data

Mar. 7, 2013  (JP) .................................. 2013-046024

(51) Int. Cl.
*H04B 7/02* (2006.01)
*H04B 7/04* (2006.01)
*H04B 7/06* (2006.01)

(52) U.S. Cl.
CPC ............ *H04B 7/0478* (2013.01); *H04B 7/0413* (2013.01); *H04B 7/0417* (2013.01);
(Continued)

(58) Field of Classification Search
CPC .. H04B 7/0689; H04B 7/0417; H04B 7/0452; H04L 1/0618
USPC ........................................................ 375/267
See application file for complete search history.

(56) References Cited

U.S. PATENT DOCUMENTS 8,467,469 B2 *  6/2013  Lee ...................... H04B 7/0473
                                                370/334
8,787,261 B2    7/2014  Taoka et al.
(Continued)

FOREIGN PATENT DOCUMENTS

WO    2011/043191 A1    4/2011
WO    2012/005476 A2    1/2012
WO    2012/146982 A1    11/2012

OTHER PUBLICATIONS

Office Action in counterpart Japanese Patent Application No. 2013-046024 mailed Aug. 18, 2015 (6 pages).
NTT DOCOMO; "Structured codebook design for 8 to 12 bit PMI feedback for DL MU-MIMO enhancement"; 3GPP TSG RAN WG1 Meeting #67, R1-114080; San Francisco, USA; Nov. 14-18, 2011 (7 pages).

(Continued)

*Primary Examiner* — Helene Tayong
(74) *Attorney, Agent, or Firm* — Osha Liang LLP

(57) ABSTRACT

Techniques for providing codebooks extended by gain information that can be transmitted in a reduced amount of signaling are disclosed. A user equipment includes a transmission and reception unit communicating a radio signal with a base station in accordance with MIMO (Multiple Input Multiple Output) transmission and a codebook storage unit stores predefined codebooks to specify precoding matrices for use in the MIMO transmission. The codebooks are arranged to represent phase information and gain information and a channel measurement unit measures channel conditions based on reference signals transmitted from multiple antennas in the base station. A codebook selection unit selects a codebook to be indicated to the base station from the stored codebooks based on the measured channel conditions and instructs the transmission and reception unit to indicate feedback information to the base station and the feedback information includes a codebook index for identifying the selected codebook.

7 Claims, 8 Drawing Sheets

(52) U.S. Cl.
CPC ............ *H04B 7/0456* (2013.01); *H04B 7/0473* (2013.01); *H04B 7/061* (2013.01); *H04B 7/0617* (2013.01); *H04B 7/0639* (2013.01)

(56) References Cited

U.S. PATENT DOCUMENTS

| | | | |
|---|---|---|---|
| 8,891,656 B2* | 11/2014 | Benjebbour et al. | 375/267 |
| 9,136,924 B2* | 9/2015 | Park | |
| 2008/0198946 A1* | 8/2008 | Lee et al. | 375/299 |
| 2008/0205533 A1* | 8/2008 | Lee et al. | 375/260 |
| 2011/0080901 A1 | 4/2011 | Lin et al. | |
| 2012/0020433 A1* | 1/2012 | Bhattad et al. | 375/296 |
| 2013/0114763 A1 | 5/2013 | Park | |
| 2013/0294279 A1* | 11/2013 | Nagata et al. | 370/252 |

OTHER PUBLICATIONS

Texas Instruments; "Evaluation of downlink MIMO pre-coding for E-UTRA with 2-antenna node B"; 3GPP TSG RAN WG1 Meeting #44bis, R1-060891; Athens, Greece; Mar. 27-31, 2006 (5 pages).
International Search Report issued in corresponding application No. PCT/JP2014/053733 mailed Mar. 18, 2014 (1 page).
Written Opinion issued in corresponding application No. PCT/JP2014/053733 mailed Mar. 18, 2014 (3 pages).
3GPP TS 36.211 V8.9.0; "3rd Generation Partnership Project; Technical Specification Group Radio Access Network; Evolved Universal Terrestrial Radio Access (E-UTRA); Physical Channels and Modulation (Release 8)"; Dec. 2009 (83 pages).
3GPP TS 36.211 V10.6.0; "3rd Generation Partnership Project; Technical Specification Group Radio Access Network; Evolved Universal Terrestrial Radio Access (E-UTRA); Physical Channels and Modulation (Release 10)"; Dec. 2012 (101 pages).

* cited by examiner $$W = \begin{pmatrix} g_{11}\phi_{11} & g_{12}\phi_{12} \\ g_{21}\phi_{21} & g_{22}\phi_{22} \\ g_{31}\phi_{31} & g_{32}\phi_{32} \\ g_{41}\phi_{41} & g_{42}\phi_{42} \end{pmatrix}, |\phi_{ij}| = \text{constant}$$

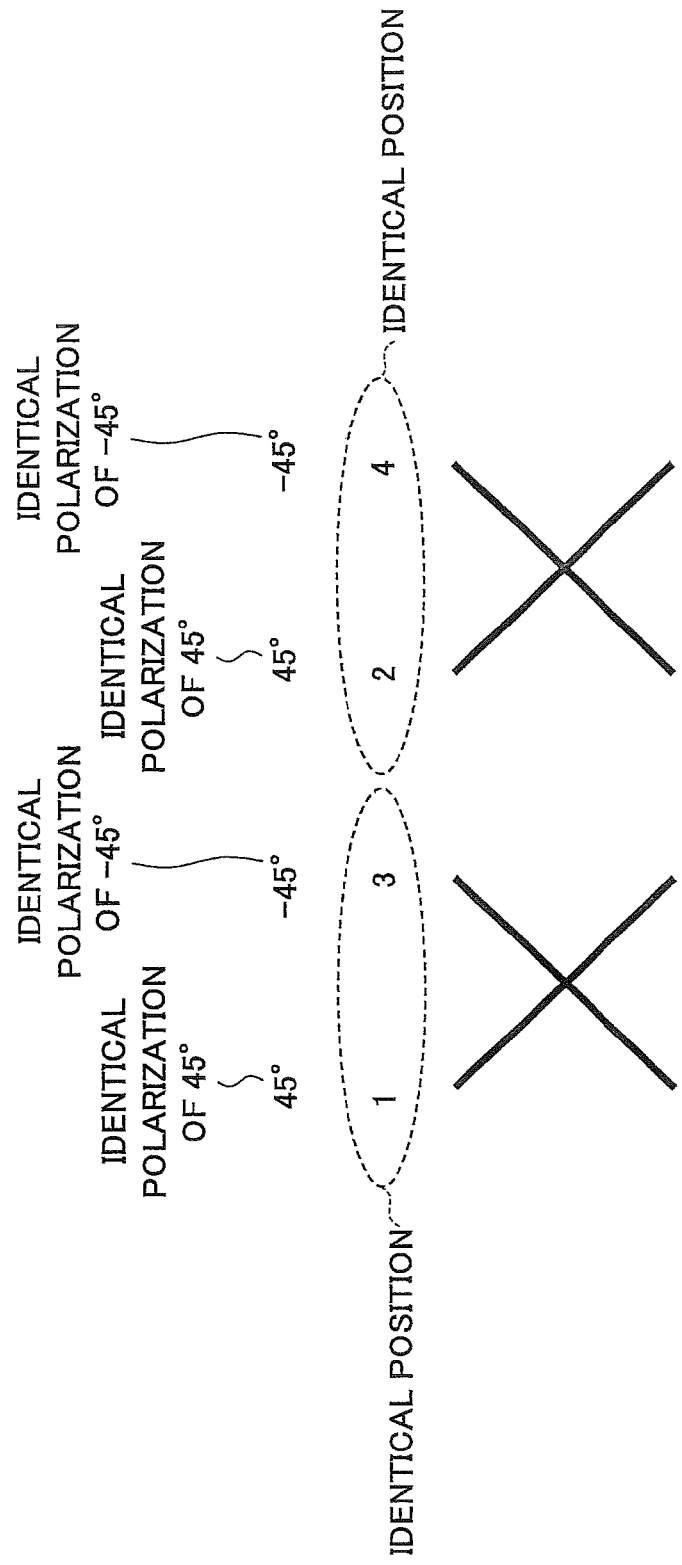

FIG.6

| Codebook index | $u_n$ | Number of layers $v$ | | | |
|---|---|---|---|---|---|
| | | 1 | 2 | 3 | 4 |
| 0 | $u_0 = [1\ -1\ -1\ -1]^T$ | $W_0^{(1)}$ | $W_0^{(14)}/\sqrt{2}$ | $W_0^{(124)}/\sqrt{3}$ | $W_0^{(1234)}/2$ |
| 1 | $u_1 = [1\ -j\ 1\ j]^T$ | $W_1^{(1)}$ | $W_1^{(12)}/\sqrt{2}$ | $W_1^{(123)}/\sqrt{3}$ | $W_1^{(1234)}/2$ |
| 2 | $u_2 = [1\ 1\ -1\ 1]^T$ | $W_2^{(1)}$ | $W_2^{(12)}/\sqrt{2}$ | $W_2^{(123)}/\sqrt{3}$ | $W_2^{(3214)}/2$ |
| 3 | $u_3 = [1\ j\ 1\ -j]^T$ | $W_3^{(1)}$ | $W_3^{(12)}/\sqrt{2}$ | $W_3^{(123)}/\sqrt{3}$ | $W_3^{(3214)}/2$ |
| 4 | $u_4 = [1\ (-1-j)/\sqrt{2}\ -j\ (1-j)/\sqrt{2}]^T$ | $W_4^{(1)}$ | $W_4^{(14)}/\sqrt{2}$ | $W_4^{(124)}/\sqrt{3}$ | $W_4^{(1234)}/2$ |
| 5 | $u_5 = [1\ (1-j)/\sqrt{2}\ j\ (-1-j)/\sqrt{2}]^T$ | $W_5^{(1)}$ | $W_5^{(14)}/\sqrt{2}$ | $W_5^{(124)}/\sqrt{3}$ | $W_5^{(1234)}/2$ |
| 6 | $u_6 = [1\ (1+j)/\sqrt{2}\ -j\ (-1+j)/\sqrt{2}]^T$ | $W_6^{(1)}$ | $W_6^{(13)}/\sqrt{2}$ | $W_6^{(134)}/\sqrt{3}$ | $W_6^{(1324)}/2$ |
| 7 | $u_7 = [1\ (-1+j)/\sqrt{2}\ j\ (1+j)/\sqrt{2}]^T$ | $W_7^{(1)}$ | $W_7^{(13)}/\sqrt{2}$ | $W_7^{(134)}/\sqrt{3}$ | $W_7^{(1324)}/2$ |
| 8 | $u_8 = [1\ -1\ 1\ 1]^T$ | $W_8^{(1)}$ | $W_8^{(12)}/\sqrt{2}$ | $W_8^{(124)}/\sqrt{3}$ | $W_8^{(1234)}/2$ |
| 9 | $u_9 = [1\ -j\ -1\ -j]^T$ | $W_9^{(1)}$ | $W_9^{(14)}/\sqrt{2}$ | $W_9^{(134)}/\sqrt{3}$ | $W_9^{(1234)}/2$ |
| 10 | $u_{10} = [1\ 1\ 1\ -1]^T$ | $W_{10}^{(1)}$ | $W_{10}^{(13)}/\sqrt{2}$ | $W_{10}^{(123)}/\sqrt{3}$ | $W_{10}^{(1324)}/2$ |
| 11 | $u_{11} = [1\ j\ -1\ j]^T$ | $W_{11}^{(1)}$ | $W_{11}^{(13)}/\sqrt{2}$ | $W_{11}^{(134)}/\sqrt{3}$ | $W_{11}^{(1324)}/2$ |
| 12 | $u_{12} = [1\ -1\ -1\ 1]^T$ | $W_{12}^{(1)}$ | $W_{12}^{(12)}/\sqrt{2}$ | $W_{12}^{(123)}/\sqrt{3}$ | $W_{12}^{(1234)}/2$ |
| 13 | $u_{13} = [1\ -1\ 1\ -1]^T$ | $W_{13}^{(1)}$ | $W_{13}^{(13)}/\sqrt{2}$ | $W_{13}^{(123)}/\sqrt{3}$ | $W_{13}^{(1324)}/2$ |
| 14 | $u_{14} = [1\ 1\ -1\ -1]^T$ | $W_{14}^{(1)}$ | $W_{14}^{(13)}/\sqrt{2}$ | $W_{14}^{(123)}/\sqrt{3}$ | $W_{14}^{(3214)}/2$ |
| 15 | $u_{15} = [1\ 1\ 1\ 1]^T$ | $W_{15}^{(1)}$ | $W_{15}^{(12)}/\sqrt{2}$ | $W_{15}^{(123)}/\sqrt{3}$ | $W_{15}^{(1234)}/2$ |
| 16 ⋮ 31 | $u_{16},...,u_{31} = [g_1\phi_1\ g_2\phi_2\ g_3\phi_3\ g_4\phi_4]^T$ | $W_0^{(1)}$ | $W_0^{(14)}/\sqrt{2}$ | $W_0^{(124)}/\sqrt{3}$ | $W_0^{(1234)}/2$ |
| | | $W_1^{(1)}$ | $W_1^{(12)}/\sqrt{2}$ | $W_1^{(123)}/\sqrt{3}$ | $W_1^{(1234)}/2$ |
| | | $W_2^{(1)}$ | $W_2^{(12)}/\sqrt{2}$ | $W_2^{(123)}/\sqrt{3}$ | $W_2^{(3214)}/2$ |
| | | $W_3^{(1)}$ | $W_3^{(12)}/\sqrt{2}$ | $W_3^{(123)}/\sqrt{3}$ | $W_3^{(3214)}/2$ |
| | | $W_4^{(1)}$ | $W_4^{(14)}/\sqrt{2}$ | $W_4^{(124)}/\sqrt{3}$ | $W_4^{(1234)}/2$ |
| | | $W_5^{(1)}$ | $W_5^{(14)}/\sqrt{2}$ | $W_5^{(124)}/\sqrt{3}$ | $W_5^{(1234)}/2$ |
| | | $W_6^{(1)}$ | $W_6^{(13)}/\sqrt{2}$ | $W_6^{(134)}/\sqrt{3}$ | $W_6^{(1324)}/2$ |
| | | $W_7^{(1)}$ | $W_7^{(13)}/\sqrt{2}$ | $W_7^{(134)}/\sqrt{3}$ | $W_7^{(1324)}/2$ |
| | | $W_8^{(1)}$ | $W_8^{(12)}/\sqrt{2}$ | $W_8^{(124)}/\sqrt{3}$ | $W_8^{(1234)}/2$ |
| | | $W_9^{(1)}$ | $W_9^{(14)}/\sqrt{2}$ | $W_9^{(134)}/\sqrt{3}$ | $W_9^{(1234)}/2$ |
| | | $W_{10}^{(1)}$ | $W_{10}^{(13)}/\sqrt{2}$ | $W_{10}^{(123)}/\sqrt{3}$ | $W_{10}^{(1324)}/2$ |
| | | $W_{11}^{(1)}$ | $W_{11}^{(13)}/\sqrt{2}$ | $W_{11}^{(134)}/\sqrt{3}$ | $W_{11}^{(1324)}/2$ |
| | | $W_{12}^{(1)}$ | $W_{12}^{(12)}/\sqrt{2}$ | $W_{12}^{(123)}/\sqrt{3}$ | $W_{12}^{(1234)}/2$ |
| | | $W_{13}^{(1)}$ | $W_{13}^{(13)}/\sqrt{2}$ | $W_{13}^{(123)}/\sqrt{3}$ | $W_{13}^{(1324)}/2$ |
| | | $W_{14}^{(1)}$ | $W_{14}^{(13)}/\sqrt{2}$ | $W_{14}^{(123)}/\sqrt{3}$ | $W_{14}^{(3214)}/2$ |
| | | $W_{15}^{(1)}$ | $W_{15}^{(12)}/\sqrt{2}$ | $W_{15}^{(123)}/\sqrt{3}$ | $W_{15}^{(1234)}/2$ |

USER EQUIPMENT AND BASE STATION

TECHNICAL FIELD

The present invention relates to a radio communication system.

BACKGROUND ART

In recent years, MIMO (Multiple Input Multiple Output) has been discussed as a transmission technique to improve frequency efficiency in radio communication. In MIMO transmission, both a transmitter and a receiver transmit and receive radio signals through space multiplexing using multiple antennas. In 3GPP (Third Generation Partnership Project), the MIMO transmission has been introduced in 3GPP TS 36.211 V8.9.0 (referred to as Release 8 hereinafter). Also, in 3GPP TS 36.211 V10.6.0 (referred to as Release 10 hereinafter), the MIMO transmission has been specified to, implement ZF (Zero Forcing), block diagonalization and so on.

In the MIMO transmission, a transmitter performs phase control (precoding) on each stream for transmission and transmits the phase controlled streams from multiple antennas. In this phase control, a precoding matrix selected based on feedback information (codebook) from a receiver is used. From this reason, the feedback information provided from the receiver is an important factor to implement the MIMO transmission.

For example, in Release 8, the receiver has 16 codebooks based on a table as set forth.

The receiver measures a channel condition based on a reference signal received from the transmitter and selects a codebook based on phase information derived from the channel condition. The selected codebook is fed back to the transmitter in a codebook index indicative of the codebook. The codebooks specified in Table 1 are specified such that all the codebooks have uniform amplitude.

In Release 10, it is assumed that cross polarized antennas (CPAs) are used, and the receiver feeds two codebooks $W_1$ and $W_2$ representing the phase information back to the transmitter.

[Formula 1]

$$W = W_1 W_2 = \begin{bmatrix} X & 0 \\ 0 & X \end{bmatrix} \begin{bmatrix} Y \\ \varphi_n Y \end{bmatrix} \quad (1)$$

Here, $W_1$ represents a broadband/long-term channel quality, and $W_2$ represents a subband/short-term channel quality.

As one example of the codebooks $W_1$ and $W_2$ in Formula (1), the following is presently proposed.

[Formula 2]

$$X = \begin{bmatrix} 1 & 1 \\ e^{2\pi j \frac{m}{16}} & e^{2\pi j \frac{m+1}{16}} \end{bmatrix}, m = 0, 1, 2, \ldots 15 \quad (2)$$

$$Y \in \left\{ \begin{bmatrix} 1 \\ 0 \end{bmatrix}, \begin{bmatrix} 0 \\ 1 \end{bmatrix} \right\} \quad \varphi_n = e^{2\pi j \frac{n}{8}}, n = 0, 1, \ldots, 7$$

In the example in Formula (2), four bits (m=0, 1, ..., 15) are used for feedback of $W_1$, and four bits (1 bit for Y and three bits for n=0, 1, ..., 7) are used for feedback of $W_2$.

TABLE 1

| Codebook index | $u_n$ | Number of layers v | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Also, as another example of the codebooks $W_1$ and $W_2$, the following is presently proposed.

[Formula 3]

$$X = \begin{bmatrix} 1 \\ e^{2\pi j \frac{m}{16}} \end{bmatrix}, m = 0, 1, 2, \ldots 15 \quad (3)$$

$$\varphi_n = e^{2\pi j \frac{n}{4}}, n = 0, 1, 2, 3$$

In the example in Formula (3), four bits (m=0, 1, . . . , 15) are used for feedback of $W_1$, and two bits (n=0, 1, 2, 3) are used for feedback of $W_2$.

See 3GPP TS 36.211 V8.9.0 (2009-12) and 3GPP TS 36.211 V10.6.0 (2012-12) for further details, for example.

SUMMARY OF INVENTION

Problem to be Solved by the Invention

The above-stated selection of codebooks is based on the phase information measured at the receiver. In other words, the conventional codebooks can correspond to quantization of the measured phase information. Thus, according to conventional precoding (phase control), a phase shift (φ) based on the fed back phase information is applied to each stream with respect to phase shifting. Specifically, a precoding matrix is specified based on the phase shifting, and as illustrated in FIG. 1, phase shifts $\phi_{i1}$ and $\phi_{i2}$ are multiplied with two streams $s_1$ and $s_2$, respectively, transmitted from $N_t$ antennas (four antennas in the illustrated example), and multiplexed signals $x_{Nt}$ are transmitted to the receiver.

Meanwhile, as to amplitudes, an identical amplitude is applied to each component of the precoding matrix, and the identical amplitude is applied to each stream. In other words, in the selection of codebooks, the phase information is used, but the amplitude information (gain information) is not used.

Presently, it is being discussed to extend the conventional codebooks specified in Release 8 and Release 10 to improve system performance of four cross polarized antennas based MIMO (referred to as 4Tx MIMO). The extended codebooks preferably include the codebooks already specified in the specification to ensure the conventional system performance.

Also, it is not desirable to increase the number of bits significantly to transmit feedback information due to the extension of the codebooks. In other words, it is desirable that the extended codebooks can be fed back using a reasonable number of bits.

In light of the above-stated problems, one objective of the present invention is to provide codebooks extended by gain information that can be transmitted in a reduced amount of signaling.

Means for Solving the Problem

In order to overcome the above-stated problems, one aspect of the present invention relates to a user equipment comprising: a transmission and reception unit configured to communicate a radio signal with a base station in accordance with MIMO (Multiple Input Multiple Output) transmission; a codebook storage unit configured to store predefined codebooks to specify precoding matrices for use in the MIMO transmission, wherein the codebooks are arranged to represent phase information and gain information; a channel measurement unit configured to measure channel conditions based on reference signals transmitted from multiple antennas in the base station; and a codebook selection unit configured to select a codebook to be indicated to the base station from the stored codebooks based on the measured channel conditions and instruct the transmission and reception unit to indicate feedback information to the base station, wherein the feedback information includes a codebook index for identifying the selected codebook.

Advantage of the Invention

According to the present invention, it is possible to provide codebooks extended by gain information that can be transmitted in a reduced amount of signaling.

BRIEF DESCRIPTION OF DRAWINGS

FIG. 5 is a schematic diagram for illustrating an exemplary antenna arrangement in a base station having cross polarized antennas (4TX);

FIG. 6 is a diagram for illustrating a codebook arrangement according to a third embodiment of the present invention;

EMBODIMENTS OF THE INVENTION

Embodiments of the present invention are described below with reference to the drawings.

Figure 2:
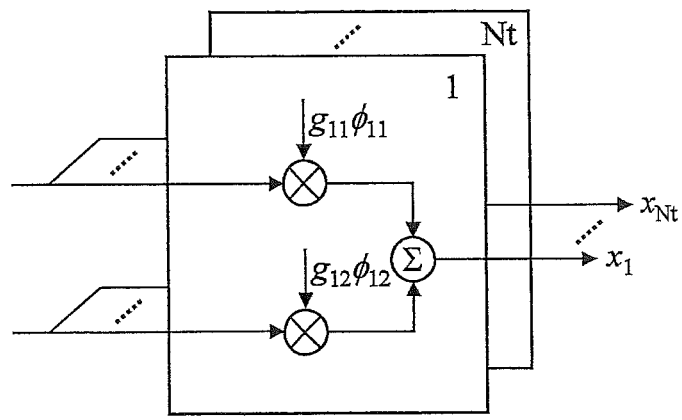
FIG. 2 is a schematic diagram for illustrating precoding according to one embodiment of the present invention.

In the embodiments of the present invention as described below, a receiver in MIMO transmission has codebooks for specifying precoding matrices for use in the MIMO transmission. These codebooks are composed to represent both phase information and gain information. The receiver measures channel conditions between transmission antennas and reception antennas based on reference signals transmitted from the multiple antennas in a transmitter. The receiver selects a codebook index suitable for the measured channel conditions from stored codebooks and transmits the selected codebook index as feedback information to the transmitter. Upon receiving the feedback information, the transmitter can perform precoding based on the phase information as well as the gain information. As illustrated in FIG. 2, a precoding matrix is specified by phase shifts (φ) and gain values (g), and $\phi_{i1}g_{i1}$ and $\phi_{i2}g_{i2}$ are multiplied with streams $s_1$ and $s_2$ (two streams in the illustrated example), respectively, transmitted from $N_t$ antennas (four antennas in the illustrated example). Then, the streams, to which the phase and the gain are applied, are multiplexed and transmitted from antenna i as a radio signal $x_{Ni}$. Note that the phase shift φ is a complex number and the gain g is a real number, and in one embodiment, $\Sigma g_{ij}^2=1$ may hold such that total transmission power does not vary.

In this manner, it is possible to use not only the phase information but also the gain information to implement precoding more suitable for the channel conditions. In the first to fifth embodiments as described below, codebooks where the phase information and the gain information are represented or quantized in a reasonable number of bits are disclosed. Particularly, the codebooks are preferable for cross polarized antennas.

A radio communication system according to one embodiment of the present invention is described with reference to FIG. 3. In the radio communication system as described below, a transmitter and a receiver can communicate with each other in MIMO transmission. In this radio communication system, the transmitter and the receiver are implemented in any of a base station and a user equipment. For example, in downlink transmission, the transmitter is a base station, and the receiver is a user equipment. On the other hand, in uplink transmission, the transmitter is a user equipment, and the receiver is a base station. The following embodiments are described in conjunction with the downlink transmission where the transmitter is a base station and the receiver is a user equipment. However, the present invention is not limited to it and can be applied to the uplink transmission analogously.

Figure 3:
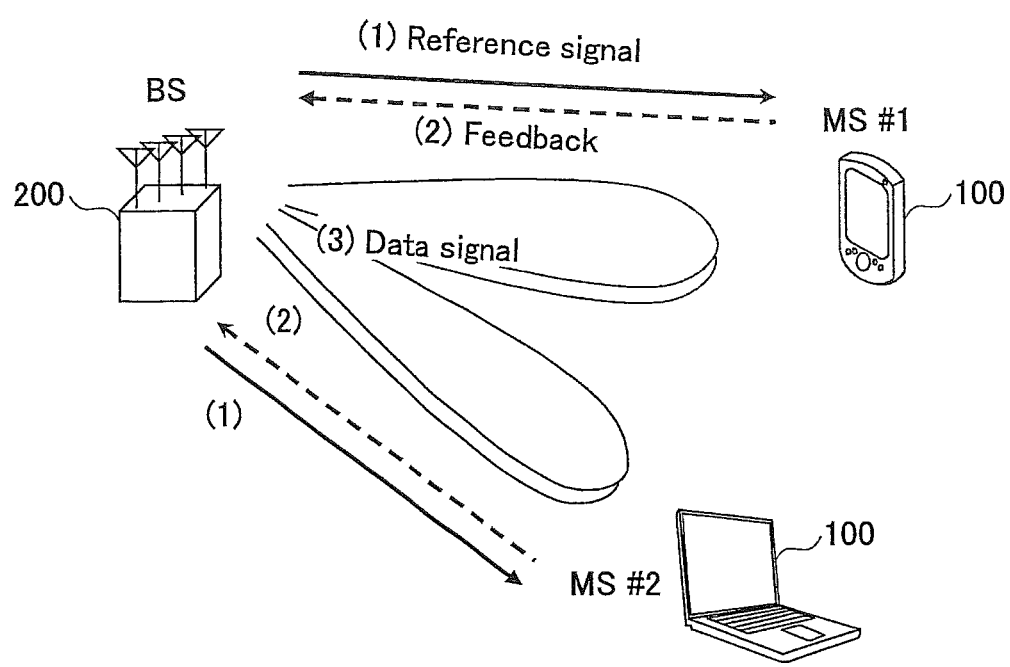
FIG. 3 is a schematic diagram of a radio communication system according to one embodiment of the present invention.

FIG. 3 is a schematic diagram of a radio communication system according to one embodiment of the present invention. As illustrated, the radio communication system 10 has a user equipment (UE) 100 and a base station (evolved NodeB) 200. In downlink transmission, the base station 200 is a transmitter, and the user equipment 100 is a receiver.

The user equipment 100 may be referred to as a mobile station (MS) and is typically an information processing device having radio communication functions such as a cellular phone, a smartphone, a tablet and a personal computer with a mobile router. In this embodiment, the user equipment 100 has multiple antennas and may support one or both of single-user MIMO (SU-MIMO) and multi-user MIMO (MU-MIMO). In one embodiment, antennas of the user equipment 100 may be cross polarized antennas.

The base station (BS) 200 transmits downlink (DL) data received from a communicatively connected upper station or server (not shown) to the user equipment 100 as well as transmits uplink (UL) data received from the user equipment 100 to an upper station (not shown) through radio connection to the user equipment 100. In the illustrated embodiment, the base station 200 has four antennas and uses these antennas to communicate with the user equipment 100 in accordance with MIMO. The base station 200 may support one or both of single-user MIMO (SU-MIMO) and multi-user MIMO (MU-MIMO). In one embodiment, antennas of the base station 200 maybe cross polarized antennas. Also, although the base station 200 has four antennas in the illustrated embodiment, the present invention is not limited to it, and any appropriate number of antennas may be used.

As illustrated, the base station 200 transmits a reference signal to the user equipment 100 in accordance with MIMO transmission. Upon receiving the reference signal, the user equipment 100 selects a codebook index suitable for a channel condition from codebooks stored in advance based on the channel condition derived from the received reference signal and transmits feedback information indicative of the selected codebook to the base station 200. Upon receiving the feedback information, the base station 200 applies a precoding matrix to streams for transmission based on the indicated codebook index and transmits data signals from the four antennas to the user equipment 100.

A user equipment according to one embodiment of the present invention is described with reference to FIG. 4. In this embodiment, the user equipment 100, which operates as a receiver in MIMO, receives a reference signal from the base station 200 being a transmitter and selects a codebook to be used by the base station 200 based on the received reference signal in accordance with any of the first to fifth embodiments as stated below.

Figure 4:
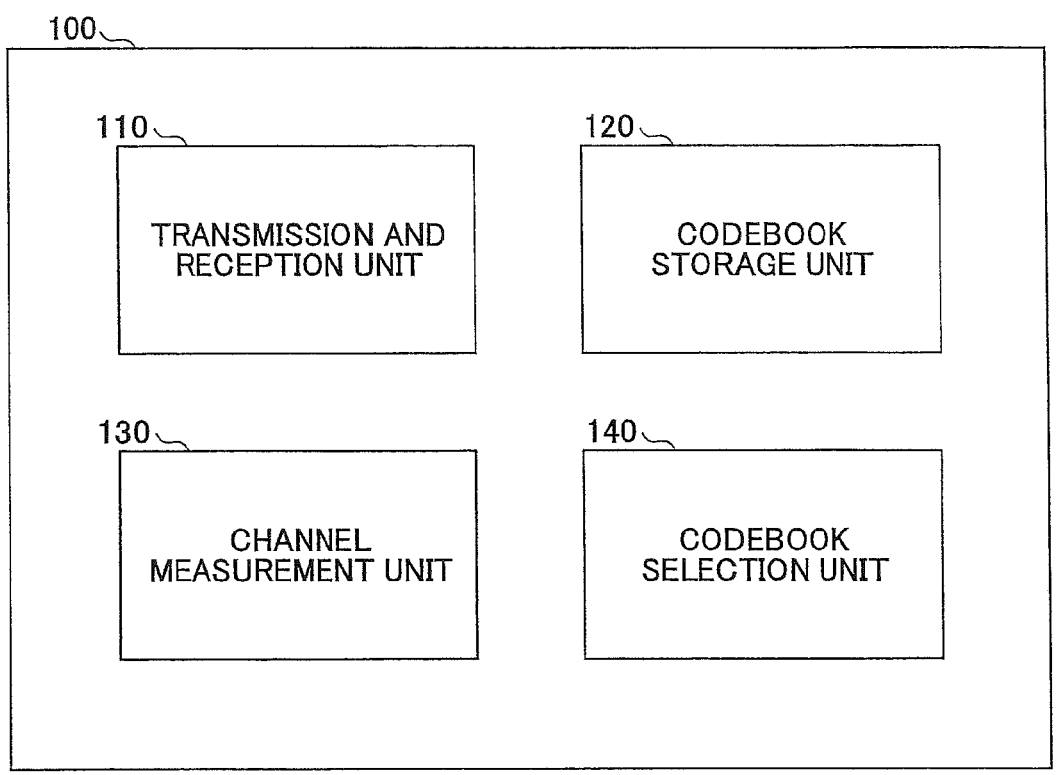
FIG. 4 is a block diagram for illustrating an arrangement of a user equipment according to one embodiment of the present invention.

FIG. 4 is a block diagram for illustrating an arrangement of a user equipment according to one embodiment of the present invention. As illustrated, the user equipment 100 has a transmission and reception unit 110, a codebook storage unit 120, a channel measurement unit 130 and a codebook selection unit 140.

The transmission and reception unit 110 communicates radio signals with the base station 200 in accordance with MIMO transmission. Specifically, upon receiving downlink signals from the base station 200 via multiple antennas, the transmission and reception unit 110 performs various reception operations such as frequency conversion, deletion of a cyclic prefix (CP) and fast Fourier transform (FFT) on the received signals to extract a data signal and a control signal. The transmission and reception unit 110 provides the control signal to the channel measurement unit 130 as well as decodes the data signal. Also, the transmission and reception unit 110 performs various transmission operations such as inverse fast Fourier transform, addition of a CP and frequency conversion on the precoded data signal for transmission as well as feedback information including a codebook selected by the codebook selection unit 140 and transmits the generated uplink signal to the base station 200.

The codebook storage unit 120 stores predefined codebooks to specify precoding matrices for use in MIMO transmission. The codebooks are composed to represent both phase information and gain information as described in conjunction with the first to fifth embodiments. The codebooks may be stored in the user equipment 100 in advance or provided from the base station 200. Details of the codebooks are subsequently described in the first to fifth embodiments.

The channel measurement unit 130 measures channel conditions between respective antennas in the user equipment 100 and respective antennas in the base station 200 based on reference signals provided from the transmission and reception unit 110. In one embodiment, the channel measurement unit 130 measures phases and gains for the respective reference signals based on the reference signals transmitted from the multiple antennas in the base station 200 and provides measurements to the codebook selection unit 140.

The codebook selection unit 140 selects a codebook to be indicated to the base station 200 from the codebooks stored in the codebook storage unit 120 based on the channel conditions measured by the channel measurement unit 130 and instructs the transmission and reception unit 110 to send feedback information including a codebook index for identifying the selected codebook to the base station 200. In one embodiment, the codebook selection unit 140 may select a codebook to maximize a communication quality such as SINR (Signal-to-Interference plus Noise power Ratio) in the stored codebooks.

First, a codebook arrangement according to the first embodiment is described. In the first embodiment, a precoding matrix W is defined as a product of a gain matrix $W_{gain}$ and a phase matrix $W_{phase}$, that is, $$W = W_{gain} W_{phase}.$$

Here, the gain matrix $W_{gain}$ is defined as a diagonal matrix having a size corresponding to the number of antennas in the base station 200, for example. In other words, for the base station 200 with 4Txs, the gain matrix $W_{gain}$ is defined as follows.

[Formula 4]

$$W_{gain} = \begin{bmatrix} g_1 & & & \\ & g_2 & & \\ & & g_3 & \\ & & & g_4 \end{bmatrix} \quad (4)$$

Figure 1:
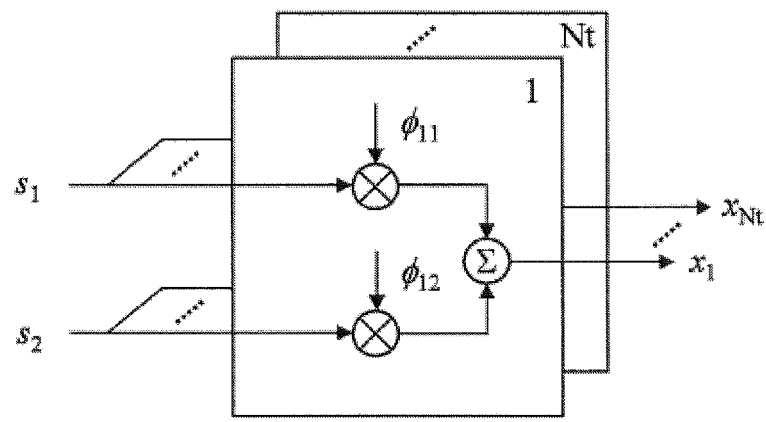
FIG. 1 is a schematic diagram for illustrating precoding according to the prior art.

The diagonal elements $g_i$ in the gain matrix $W_{gain}$ represent gains applied to respective antennas in the base station 200. Note that non-diagonal elements may be, but is not limited to, zero. On the other hand, the phase matrix $W_{phase}$ is the matrix as illustrated in FIG. 1 and specifically may be what is specified in Release 8 as illustrated in Table 1.

The gain matrix $W_{gain}$ specified in this manner enables power levels of the respective antennas in the base station 200 to be adjusted by values of the diagonal elements $g_i$. Specifically, according to Formula (4), the gain value $g_1$ is applied to the first antenna, the gain value $g_2$ is applied to the second antenna, the gain value $g_3$ is applied to the third antenna, and the gain value $g_4$ is applied to the fourth antenna.

In one embodiment, the codebook selection unit 140 may feed the phase matrix $W_{phase}$ and the gain matrix $W_{gain}$ back to the base station 200 at different feedback repetition rates and/or different granularities of frequencies. For example, the feedback repetition rates of the phase matrix $W_{phase}$ and the gain matrix $W_{gain}$ may be changed depending on relative importance between the phase information and the gain information. If the phase information has a higher relative importance than the gain information, the phase matrix $W_{phase}$ may be indicated to the base station 200 at a high feedback repetition rate while the gain matrix $W_{gain}$ may be indicated to the base station 200 at a low feedback repetition rate. On the other hand, if the phase information has a lower relative importance than the gain information, the phase matrix $W_{phase}$ may be indicated to the base station 200 at a low feedback repetition rate while the gain matrix $W_{gain}$ may be indicated to the base station 200 at a high feedback repetition rate. Also, the phase information and the gain information may be measured at different frequency bandwidths depending on the relative importance. If the phase information has a higher relative importance than the gain information, the phase matrix $W_{phase}$ may be measured over individual subbands obtained by dividing a transmission band while the gain matrix $W_{gain}$ may be measured over the whole transmission band. On the other hand, if the phase information has a lower relative importance than the gain information, the phase matrix $W_{phase}$ may be measured over the whole transmission band while the gain matrix $W_{gain}$ may be measured over individual subbands obtained by dividing the transmission band.

In one embodiment, the diagonal element $g_i$ in the gain matrix $W_{gain}$ may be specifically determined for the gain matrix $W_{gain}$ in Formula (4) as follows.

[Formula 5]

$$W_{Gain}^{(k)} = \operatorname{diag}\left\{\sqrt{\frac{\beta_k}{2+2\beta_k}}, \sqrt{\frac{\beta_k}{2+2\beta_k}}, \sqrt{\frac{1}{2+2\beta_k}}, \sqrt{\frac{1}{2+2\beta_k}}\right\}, \quad k = 0, \ldots, 3, \quad (5\text{-}1)$$

$$\beta_k = 1, 4, \frac{1}{2}, \frac{1}{4}$$

$$W_{Gain}^{(k)} = \operatorname{diag}\left\{\sqrt{\frac{\beta_k}{2+2\beta_k}}, \sqrt{\frac{1}{2+2\beta_k}}, \sqrt{\frac{\beta_k}{2+2\beta_k}}, \sqrt{\frac{1}{2+2\beta_k}}\right\}, \quad k = 4, 5, \quad (5\text{-}2)$$

$$\beta_k = 4, \frac{1}{4}$$

$$W_{Gain}^{(k)} = \operatorname{diag}\left\{\sqrt{\frac{\beta_k}{2+2\beta_k}}, \sqrt{\frac{1}{2+2\beta_k}}, \sqrt{\frac{1}{2+2\beta_k}}, \sqrt{\frac{\beta_k}{2+2\beta_k}}\right\}, \quad k = 6, 7, \quad (5\text{-}3)$$

$$\beta_k = 4, \frac{1}{4}$$

In this case, the gain information can be determined by the k value. For example, it may be determined for k=0 by substituting $\beta_0=1$ in Formula (5-1). Also, it may be determined for k=4 by substituting $\beta_4=4$ in Formula (5-2). In this manner, the diagonal elements in the gain matrix $W_{gain}$ can be determined only by specifying the k value, which can identify the gain information to be indicated to the base station 200. For example, in Formula (5), the gain information can be fed back in three bits. In other words, it is possible to implement precoding in consideration of the phase information and the gain information by transmitting three bits of the gain information in addition to four bits of the phase information.

The codebook storage unit 120 stores the phase matrices $W_{phase}$ and the gain matrices $W_{gain}$ as specified in this manner, and the codebook selection unit 140 selects the gain matrix $W_{gain}$ having diagonal elements (k=0, 1, ..., 7) to maximize communication quality among the stored gain matrices for codebooks based on measurements of channel conditions provided from the channel measurement unit 130. For example, the codebook selection unit 140 may select the gain matrix $W_{gain}$ having diagonal elements to maximize SINR. On the other hand, the phase matrix $W_{phase}$ may be selected similar to Release 8.

Note that by substituting $\beta=1$ in the gain matrix $W_{gain}$, it will be the same as codebooks as illustrated in Table 1. In other words, the codebook arrangement according to the first embodiment includes codebooks in Release 8.

Here, individual equations in Formula (5) are described. Formula (5-1) is preferred for cross polarized antennas. In other words, Formula (5-1) means that a uniform gain is applied to a set of antennas having same polarization among multiple antennas in the base station 200. It is assumed that the first to fourth antennas in the base station 200 have an antenna arrangement as illustrated in FIG. 5, that is, the first and second antennas have the same polarization of 45° and the third and fourth antennas have the same polarization of −45°. Since it is estimated that transmission characteristics of the antenna with the same polarization are similar, in Formula (5-1), a uniform gain value is applied to the diagonal elements $g_1$ and $g_2$ and a uniform gain value is applied to the diagonal elements $g_3$ and $g_4$. In other words, according to Formula (5-1), the diagonal elements in the gain matrix $W_{gain}$ can apply the uniform gains to the sets of antennas having the same polarization among the multiple antennas in the base station 200.

Also, Formula (5-2) is preferred for antennas arranged at an identical position. As illustrated in FIG. 5, the first and third antennas are arranged at an identical position, and the second and fourth antennas are arranged at an identical position. Since it is estimated that transmission characteristics of the co-located antennas are similar, in Formula (5-2), a uniform gain value is applied to the diagonal elements $g_1$ and $g_3$, and a uniform gain value is applied to the diagonal elements $g_2$ and $g_4$. In other words, according to Formula (5-2), the diagonal elements in the gain matrix $W_{gain}$ can apply the uniform gains to the sets of antennas arranged at the identical positions among the multiple antennas in the base station 200.

In this manner, the gain matrix $W_{gain}$ specified in Formula (5) can use the k value, which can be indicated in three bits, to feed combination information of antenna selection indicating which antenna should have high transmission power and the gain value indicating how much transmission power should be used back to the base station 200. Specifically, the diagonal elements in the gain matrix $W_{gain}$ are represented in the combination information of the antenna selection information indicating to which of the multiple antennas in the base station 200 a relatively large gain should be applied and the gain value information indicating how much of the gain value should be applied.

In this manner, in the first embodiment, the feedback information identifies the phase matrix $W_{phase}$ and the gain matrix $W_{gain}$, and the precoding matrix W is derived from $W_{gain}W_{phase}$. According to the first embodiment, respective power levels of antennas in the base station 200 can be adjusted by using gain values of diagonal elements in the gain matrix $W_{gain}$.

Next, a codebook arrangement according to the second embodiment is described. In the second embodiment, the precoding matrix W is specified as a product of the phase matrix $W_{phase}$ and the gain matrix $W_{gain}$, that is, $$W = W_{phase} W_{gain}.$$

The gain matrix $W_{gain}$ is specified as a diagonal matrix having a size corresponding to the number of streams transmitted from the base station 200, that is,

[Formula 6]

$$W_{gain} = \begin{bmatrix} g_1 & \\ & g_2 \end{bmatrix} \quad (6)$$

for the base station 200 having two streams. Here, diagonal elements $g_i$ in the gain matrix $W_{gain}$ represent gains applied to the respective streams transmitted from the base station 200. Note that non-diagonal elements may be, but are not limited to, zero. The phase matrix $W_{phase}$ is the matrix as illustrated in FIG. 1 and specifically may be what is specified in Release 8 as illustrated in Table 1.

The gain matrix $W_{gain}$ as specified in this manner enables respective power levels of streams transmitted from the base station 200 to be adjusted by using values of the diagonal elements $g_i$. Specifically, according to Formula (6), the gain value $g_1$ is applied to the first stream $s_1$, and the gain value $g_2$ is applied to the second stream $s_2$.

In one embodiment, similar to the first embodiment, the codebook selection unit 140 may feed the phase matrix $W_{phase}$ and the gain matrix $W_{gain}$ back to the base station 200 at different feedback repetition rates and/or different granularities of frequencies. For example, the feedback repetition rates of the phase matrix $W_{phase}$ and the gain matrix $W_{gain}$ may be changed depending on relative importance between the phase information and the gain information. Also, the phase information and the gain information may be measured at different frequency bandwidths (broadband or subband) depending on the relative importance. Also, similar to the first embodiment, the diagonal elements $g_i$ in the gain matrix $W_{gain}$ may be determined in accordance with Formula (5) for the gain matrix $W_{gain}$ in Formula (6).

The codebook storage unit 120 stores the phase matrices $W_{phase}$ and the gain matrices $W_{gain}$ as specified in this manner, and the codebook selection unit 140 selects the gain matrix $W_{gain}$ having diagonal elements (k=0, 1, ..., 7) to maximize the communication quality among the stored gain matrices $W_{gain}$ for codebooks based on channel conditions provided from the channel measurement unit 130. For example, the codebook selection unit 140 may select the gain matrix $W_{gain}$ having diagonal elements to maximize SINR. Here, the phase matrix $W_{phase}$ may be selected similar to Release 8.

In this manner, in the second embodiment, the feedback information identifies the phase matrix $W_{phase}$ and the gain matrix $W_{gain}$, and the precoding matrix W is derived from $W_{phase}W_{gain}$. According to the second embodiment, power levels of respective streams transmitted from the base station 200 can be adjusted by using gain values $g_i$ of respective diagonal elements in the gain matrix $W_{gain}$.

Next, a codebook arrangement according to the third embodiment is described. In the third embodiment, as illustrated in FIG. 6, a codebook arrangement is a single codebook arrangement and is composed by adding basis vectors $u_{16}, \ldots, u_{31}$ of codebooks representing both phase information and gain information to basis vectors $u_0, \ldots, u_{15}$ of codebooks representing the phase information as specified in Release 8.

In one embodiment, the basis vectors $u_{16}, \ldots, u_{31}$ of codebooks may be determined in accordance with the following formula where phase shifts φ are multiplied with gain values g.

[Formula 7]

$$u_{16}, \ldots, u_{31} = [g_1\phi_1 \ g_2\phi_2 \ g_3\phi_3 \ g_4\phi_4]^T \quad (7)$$

Then, the precoding matrix $W_n$ may be specified by

[Formula 8]

$$W_n = I - 2u_n u_n^H / u_n^H u_n, \quad (8)$$

and selected columns may be different from Release 8 for ranks 2, 3 and 4.

In this manner, in the third embodiment, the codebook storage unit 120 stores codebooks based on the phase information and codebooks based on the phase information and the gain information. According to the third embodiment, in addition to the codebooks based on the phase information as specified in Release 8, codebooks composed by applying the gain g to the phase shift φ in each element of the basis vector $u_i$ of codebooks are added. In other words, the gain value g will be mapped to a Householder matrix.

Next, a codebook arrangement according to the fourth embodiment is described. In the fourth embodiment, a precoding matrix W is defined as a product of a first matrix $W_1$ and a second matrix $W_2$. Here, the first matrix $W_1$ represents phase information, and the second matrix $W_2$ represents both the phase information and gain information. In one embodiment, the first matrix $W_1$ may represent a broadband/long-term channel condition, and the second matrix $W_2$ may represent a gain information applied narrowband (subband)/short-term channel condition. The precoding matrix W is specified as follows.

[Formula 9]

$$W = W_1 W_2 = \begin{bmatrix} X_1 & 0 \\ 0 & X_2 \end{bmatrix} \begin{bmatrix} G_1^{(k)} Y \\ \varphi_n G_2^{(k)} Y \end{bmatrix} \quad (9)$$

In other words, the first matrix $W_1$ in Formula (9) does not need to use an identical matrix X in diagonal elements as defined in Formula (1), and different matrices such as $X_1$ and $X_2$ may be used. In one embodiment, for example, the matrices $X_1$ and $X_2$ may be specified as follows.

[Formula 10]

$$X_1 = \begin{bmatrix} 1 & 1 & 1 & 1 \\ e^{2\pi j \frac{m}{16}} & e^{2\pi j \frac{m+1}{16}} & e^{2\pi j \frac{m+2}{16}} & e^{2\pi j \frac{m+3}{16}} \end{bmatrix} \quad (10)$$

$$X_2 = \begin{bmatrix} e^{2\pi j \frac{2m}{16}} & e^{2\pi j \frac{2(m+1)}{16}} & e^{2\pi j \frac{2(m+2)}{16}} & e^{2\pi j \frac{2(m+3)}{16}} \\ e^{2\pi j \frac{3m}{16}} & e^{2\pi j \frac{3(m+1)}{16}} & e^{2\pi j \frac{3(m+2)}{16}} & e^{2\pi j \frac{3(m+3)}{16}} \end{bmatrix}$$

Here, m may be 0, 2, 4, 6, 8, 10, 12, 14 and so on and may be represented in three bits. Column vectors in the matrices $X_1$ and $X_2$ as specified in this manner have continuous phase rotation, which can improve characteristics in ULA (Uniform Linear Array) antennas.

Also, in the second matrix $W_2$ in Formula (9), for example, by using the arrangement in Formula (1), gain values

[Formula 11]

$$G_1^{(k)} = \sqrt{\frac{\beta_k}{2 + 2\beta_k}} \quad (11)$$

$$G_2^{(k)} = \sqrt{\frac{\beta_k}{2 + 2\beta_k}}$$

may be multiplied with $W_2$.

For example, the gain information may be identified by the k value of two bits (k=0, 1, 2, 3), and $\beta_k$=1, 4, 1/2, 1/4 may be assigned depending on the k value.

Regarding feedback overhead of the fourth embodiment, if $W_1$ is a discrete Fourier transform vector, four bits are used for feedback of $W_1$. On the other hand, if $\beta_n$ in $W_2$ is represented in two or three bits and gain information k is represented in two bits, four or five bits are used for feedback of $W_2$. Also, if one bit is added to select an element in Y as in Formula (2), five or six bits are used for feedback of $W_2$.

In this manner, in the fourth embodiment, the feedback information identifies the first matrix $W_1$ representing the phase information and the second matrix $W_2$ representing the phase information and the gain information, and the precoding matrix is derived from $W_1 W_2$.

Next, a codebook arrangement according to the fifth embodiment is described. In the fifth embodiment, a precoding matrix W is a product of a first matrix $W_1$ and a second matrix $W_2$. Here, the first matrix $W_1$ represents both phase information and gain information, and the second matrix $W_2$ represents the phase information. In one embodiment, the first matrix $W_1$ represents a gain information applied broadband/long-term channel condition, and the second matrix $W_2$ represents a narrowband (subband)/short-term channel condition. The precoding matrix W is specified as follows.

[Formula 12]

$$W = W_1 W_2 = \begin{bmatrix} G_1^{(k)} X & 0 \\ 0 & G_2^{(k)} X \end{bmatrix} \begin{bmatrix} Y \\ \varphi_n Y \end{bmatrix} \quad (12)$$

In the first matrix $W_1$ in Formula (12), gain values $G_i^{(k)}$ are multiplied with diagonal elements $X_1$ and $X_2$ in $W_1$ in Formula (1). In other words, the first matrix $W_1$ has respective products $G_1^{(k)} X_1$ and $G_2^{(k)} X_2$ in diagonal components where matrices $G_1^{(k)}$ and $G_2^{(k)}$ represent the gain information and matrices $X_1$ and $X_2$ represent the phase information.

Similar to the fourth embodiment, the first matrix $W_1$ in Formula (12) does not need an identical matrix X as defined in Formula (1), and different matrices such as $X_1$ and $X_2$ may be used. Here, similar to the fourth embodiment, for example, the matrices $X_1$ and $X_2$ may be specified as follows.

[Formula 13]

$$X_1 = \begin{bmatrix} 1 & 1 & 1 & 1 \\ e^{2\pi j \frac{m}{16}} & e^{2\pi j \frac{m+1}{16}} & e^{2\pi j \frac{m+2}{16}} & e^{2\pi j \frac{m+3}{16}} \end{bmatrix} \quad (13)$$

$$X_2 = \begin{bmatrix} e^{2\pi j \frac{m}{16}} & e^{2\pi j \frac{2(m+1)}{16}} & e^{2\pi j \frac{2(m+2)}{16}} & e^{2\pi j \frac{2(m+3)}{16}} \\ e^{2\pi j \frac{3m}{16}} & e^{2\pi j \frac{3(m+1)}{16}} & e^{2\pi j \frac{3(m+2)}{16}} & e^{2\pi j \frac{3(m+3)}{16}} \end{bmatrix}$$

Here, m may be 0, 2, 4, 6, 8, 10, 12, 14 and so on and may be represented in three bits. Column vectors in the matrices $X_1$ and $X_2$ as specified in this manner have continuous phase rotation, which can improve characteristics in ULA (Uniform Linear Array) antennas.

Also, for example, the second matrix $W_2$ in Formula (12) may be specified as follows.

[Formula 14]

$$Y \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\} \quad (14)$$

$$\varphi_n = e^{2\pi j \frac{n}{4}}$$

In this case, two bits are used to identify the vector Y for identifying beams transmitted from the base station 200, and n indicative of phase shift amounts for respective antennas in the base station 200 may be specified in two bits.

In one embodiment, the matrix $G_i^{(k)}$ representing the gain information in the first matrix $W_1$ is represented as diagonal matrices, and similar to the first and second embodiments, diagonal elements in the diagonal matrices may be specified as follows.

[Formula 15]

$$k = 0, \ldots 3, \quad (15\text{-}1)$$

$$\begin{cases} G_1^{(k)} = \mathrm{diag}\left( \sqrt{\frac{\beta_k}{2+2\beta_k}}, \sqrt{\frac{\beta_k}{2+2\beta_k}} \right) \\ G_2^{(k)} = \mathrm{diag}\left( \sqrt{\frac{1}{2+2\beta_k}}, \sqrt{\frac{1}{2+2\beta_k}} \right) \end{cases}, \beta_k = 1, 4, \frac{1}{2}, \frac{1}{4}$$

$$k = 4, 5, \quad (15\text{-}2)$$

$$\left\{ G_1^{(k)} = G_2^{(k)} = \mathrm{diag}\left( \sqrt{\frac{\beta_k}{2+2\beta_k}}, \sqrt{\frac{1}{2+2\beta_k}} \right) \right\}, \beta_k = 4, \frac{1}{4}$$

$$k = 6, 7, \quad (15\text{-}3)$$

$$\begin{cases} G_1^{(k)} = \mathrm{diag}\left( \sqrt{\frac{\beta_k}{2+2\beta_k}}, \sqrt{\frac{1}{2+2\beta_k}} \right) \\ G_2^{(k)} = \mathrm{diag}\left( \sqrt{\frac{1}{2+2\beta_k}}, \sqrt{\frac{\beta_k}{2+2\beta_k}} \right) \end{cases}, \beta_k = 4, \frac{1}{4}$$

In this case, the gain information can be determined by using the k value. For example, for k=0, it is obtained by assigning $\beta_0=1$ in Formula (15-1). Also, for k=4, it is obtained by assigning $\beta_4=4$ in Formula (15-2). In this manner, the gain value $G_1^{(k)}$ can be determined by determining the k value, and the gain information can be fed back in three bits in Formula (15). The diagonal matrices $G_i^{(k)}$ as specified in this manner will represent gain values applied to respective beams transmitted from the base station 200.

Similar to the first and second embodiments, Formula (15-1) is preferred for cross polarized antennas. In other words, Formula (15-1) applies a uniform gain to a set of antennas having identical polarizations among multiple antennas in the base station 200. Also, Formula (15-2) is preferred for antennas disposed at a same position.

The codebook selection unit 140 selects a gain value $G_i^{(k)}$ to maximize communication quality among the gain values $G_i^{(k)}$ based on channel conditions measured by the channel measurement unit 130. For example, the codebook selection unit 140 may select the gain value $G_i^{(k)}$ to maximize SINR.

Regarding feedback overhead of the fifth embodiment, if X and $G_i^{(k)}$ in $W_1$ are specified as follows,

[Formula 16]

$$X_1 = X_2 = \begin{bmatrix} 1 \\ e^{2\pi j \frac{m}{16}} \end{bmatrix}, m = 0, 1, 2, \ldots 15 \qquad (16)$$

$$G_1^{(k)}, G_2^{(k)}, k = 0, 1, 2, \ldots 7,$$

seven bits are used for feedback of $W_1$, and if $\phi$ in $W_2$ is specified as follows,

[Formula 17]

$$\varphi_n = e^{2\pi j \frac{n}{4}}, n = 0, 1, 2, 3, \qquad (17)$$

two bits are used for feedback of $W_2$. In this case, X represents a single beam, and $G_i^{(k)}$ represents a single gain.

In other embodiments, if $X_1$, $X_2$ and $G_i^{(k)}$ in $W_1$ are specified as follows,

[Formula 18]

$$X_1 = \begin{bmatrix} 1 & 1 & 1 & 1 \\ e^{2\pi j \frac{m}{16}} & e^{2\pi j \frac{m+1}{16}} & e^{2\pi j \frac{m+2}{16}} & e^{2\pi j \frac{m+3}{16}} \end{bmatrix} \qquad (18)$$

$$X_2 = \begin{bmatrix} e^{2\pi j \frac{m}{16}} & e^{2\pi j \frac{2(m+1)}{16}} & e^{2\pi j \frac{2(m+2)}{16}} & e^{2\pi j \frac{2(m+3)}{16}} \\ e^{2\pi j \frac{3m}{16}} & e^{2\pi j \frac{3(m+1)}{16}} & e^{2\pi j \frac{3(m+2)}{16}} & e^{2\pi j \frac{3(m+3)}{16}} \end{bmatrix}$$

$$G_1^{(k)}, G_2^{(k)}, k = 0, 1, 2, \ldots 7,$$

six bits are used for feedback of $W_1$, and if $\phi$ in $W_2$ is specified as follows,

[Formula 19]

$$Y \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\} \qquad (19)$$

$$\varphi_n = e^{2\pi j \frac{n}{4}},$$

three bits are used for feedback of $W_2$. In this case, $X_1$ and $X_2$ represent multi-beams. $G_i^{(k)}$ represents a single gain.

In other embodiment, if $X_1$, $X_2$ and $G_i^{(k)}$ in $W_1$ are specified as follows,

[Formula 20]

$$W_1 = \begin{bmatrix} [G_1^{(1)} X_1, G_1^{(2)} X_1, & 0 \\ G_1^{(3)} X_1, G_1^{(4)} X_1] & [G_2^{(1)} X_2, G_2^{(2)} X_2, \\ 0 & G_2^{(3)} X_2, G_2^{(4)} X_2] \end{bmatrix} \qquad (20)$$

$$X_1 = X_2 = \begin{bmatrix} 1 \\ e^{2\pi j \frac{m}{16}} \end{bmatrix}, m = 0, 1, 2, \ldots 15,$$

four bits are used for feedback of $W_1$, and if $W_2$ is specified as follows,

[Formula 21]

$$\varphi_n = e^{2\pi j \frac{m}{4}}, n = 0, 1, 2, 3 \qquad (21)$$

$$Y \in \left\{ \begin{bmatrix} 1 \\ 0 \\ 0 \\ 0 \end{bmatrix}, \begin{bmatrix} 0 \\ 1 \\ 0 \\ 0 \end{bmatrix}, \begin{bmatrix} 0 \\ 0 \\ 1 \\ 0 \end{bmatrix}, \begin{bmatrix} 0 \\ 0 \\ 0 \\ 1 \end{bmatrix} \right\},$$

four bits are used for feedback of $W_2$. In this case, $X_1$ and $X_2$ represent a single beam. $G_i^{(k)}$ represents multi-gains.

In the above-stated first to fifth embodiments, the gain value $\beta$ is specified by an upper layer and is dynamically selected. However, $\beta$ of the present invention is not limited to it. For example, $\beta$ may be a fixed value or may be specified by an upper layer. Also, $\beta$ may be specified as a, 2a, 1/a and 1/2a or a, 2a, 1 and 1/2a or others and may be calculated by a single a. Also, the gain value $\beta$ may be estimated by the base station 200 based on an uplink signal. As a result, the base station 200 may perform gain control based on the gain value estimated by itself. In this case, the feedback information from the user equipment 100 will be unnecessary.

Figure 7:
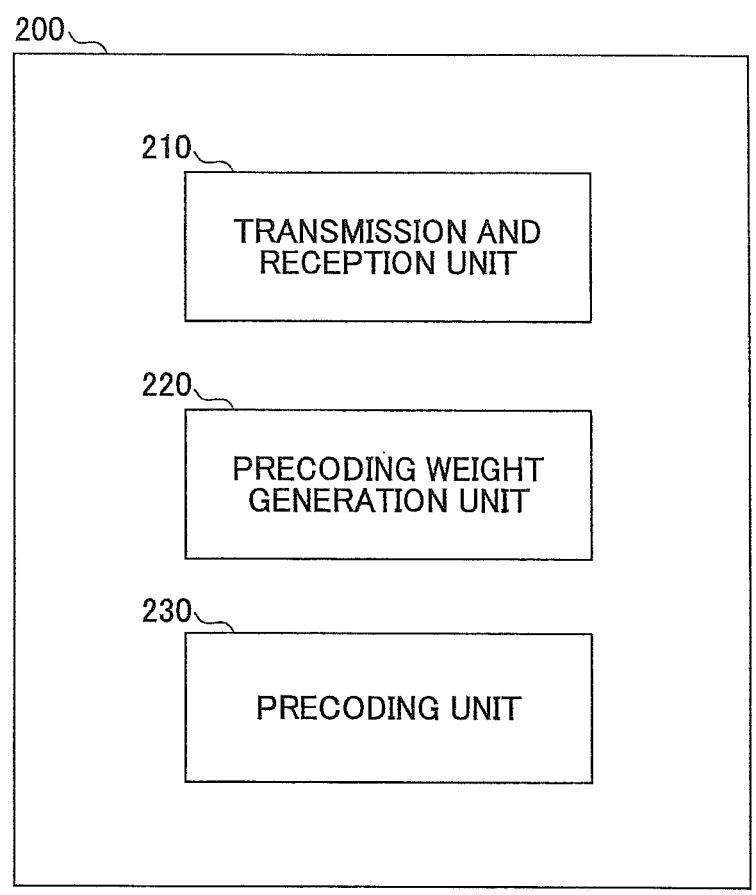
FIG. 7 is a block diagram for illustrating an arrangement of a base station according to one embodiment of the present invention.

Next, a base station according to one embodiment of the present invention is described with reference to FIG. 7. FIG. 7 is a block diagram for illustrating an arrangement of a base station according to one embodiment of the present invention.

As illustrated in FIG. 7, the base station 200 has a transmission and reception unit 210, a precoding weight generation unit 220 and a precoding unit 230.

The transmission and reception unit 210 communicates radio signals with the user equipment 100 in accordance with MIMO transmission. Specifically, upon receiving uplink signals from the user equipment 100 via multiple antennas, the transmission and reception unit 210 performs various reception operations such as frequency conversion, deletion of a cyclic prefix (CP) and fast Fourier transform on the received signals to extract a data signal and a control signal. The transmission and reception unit 210 provides feedback information included in the control signal from the user equipment 100 to the precoding weight generation unit 220. Also, the transmission and reception unit 210 performs various transmission operations such as inverse fast Fourier transform, addition of a CP and frequency conversion on the data signal precoded by the precoding unit 230 for transmission and transmits the downlink signal to the user equipment 100. The downlink signal may include a reference signal.

The precoding weight generation unit 220 extracts phase information and gain information from the feedback information provided from the transmission and reception unit 210. For example, the phase information and the gain information may be identified by codebook indices. The precoding weight generation unit 220 uses any of the above-stated first to fifth embodiments to derive a precoding matrix based on the extracted phase information and gain information and generates precoding weights based on the derived precoding matrix. The precoding weight generation unit 220 provides the generated precoding weights to the precoding unit 230.

The precoding unit 230 generates radio signals for respective antennas in the base station 200 by applying the generated precoding weights to streams transmitted to the user equipment 100. Then, the precoding unit 230 provides the generated radio signals to the transmission and reception unit 210 for transmission via the corresponding antennas.

Figure 8:
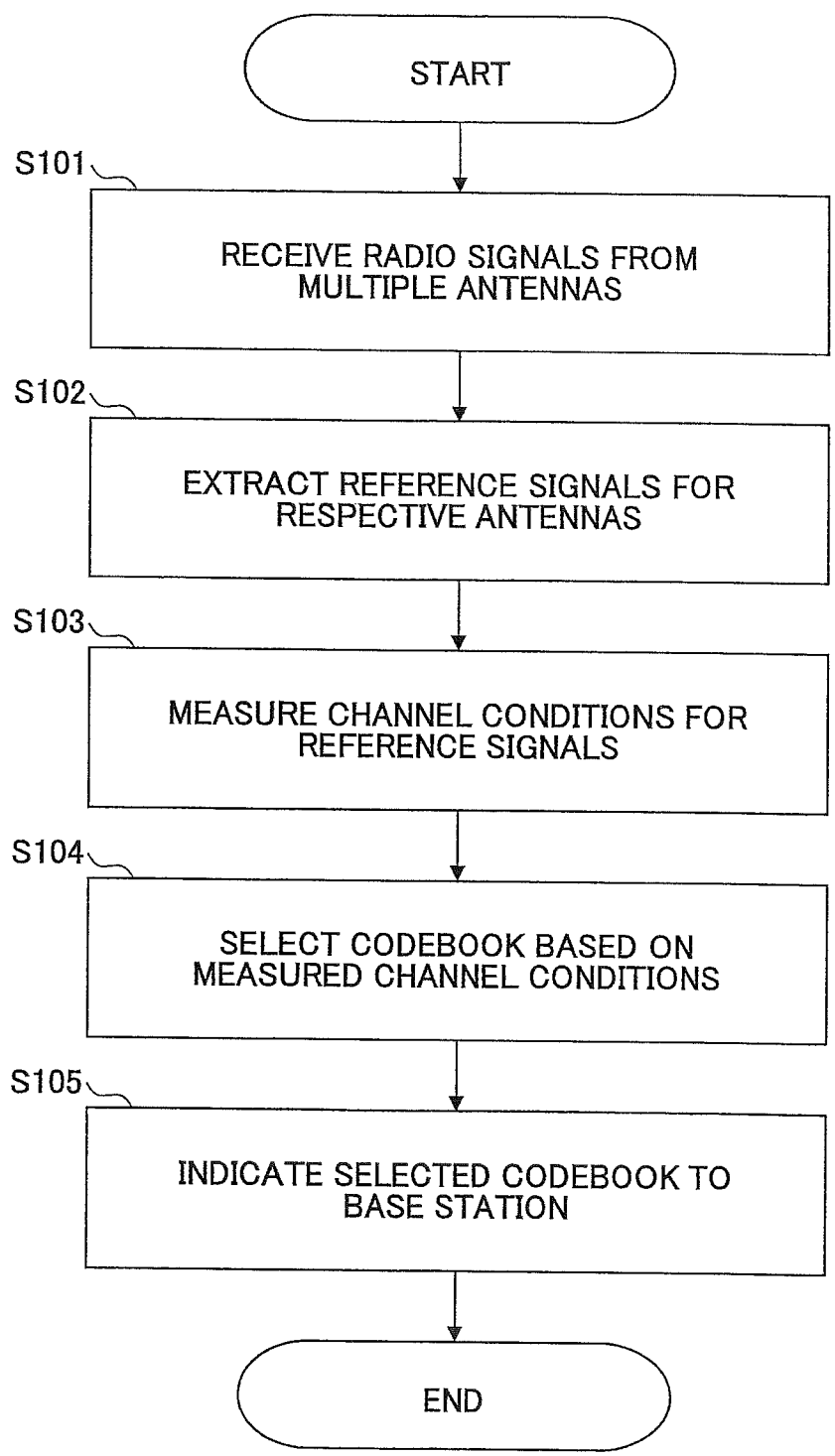
FIG. 8 is a flowchart illustrating a codebook feedback operation in a user equipment according to one embodiment of the present invention.

Next, a codebook feedback operation in a user equipment according to one embodiment of the present invention is described with reference to FIG. 8. FIG. 8 is a flowchart for illustrating a codebook feedback operation in the user equipment according to one embodiment of the present invention.

As illustrated in FIG. 8, at step S101, the user equipment 100 receives radio signals from multiple antennas in the base station 200 in accordance with MIMO transmission.

At step S102, the user equipment 100 extracts reference signals for the respective antennas from the received radio signals.

At step S103, the user equipment 100 measures channel conditions for respective channels from the reference signals.

At step S104, the user equipment 100 selects a codebook suitable for the channel conditions from codebooks arranged in accordance with any of the above-stated first to fifth embodiments based on the measured channel conditions.

At step S105, the user equipment 100 indicates a codebook index for identifying the selected codebook as feedback information to the base station 200.

Although the above embodiments have been described with conjunction to 4Tx downlink MIMO, the present invention is not limited to it, and it would be apparent by those skilled in the art that the present invention can be also applied to MIMO and uplink MIMO using an arbitrary number of antennas without difficulty.

Although the embodiments of the present invention have been described in detail, the present invention is not limited to the specific embodiments, various modifications and variations can be made within the spirit of the present invention as recited in claims.

This international patent application is based on Japanese Priority Application No. 2013-046024 filed on Mar. 7, 2013, the entire contents of which are hereby incorporated by reference.

LIST OF REFERENCE SYMBOLS

10: radio communication system
100: user equipment
110: transmission and reception unit
120: codebook storage unit
130: channel measurement unit
140: codebook selection unit
200: base station

The invention claimed is:

1. A user equipment comprising:
a transmission and reception unit configured to communicate a radio signal with a base station in accordance with MIMO (Multiple Input Multiple Output) transmission;
a codebook storage unit configured to store predefined codebooks to specify precoding matrices for use in the MIMO transmission, wherein the codebooks are arranged to represent phase information and gain information;
a channel measurement unit configured to measure channel conditions based on reference signals transmitted from multiple antennas in the base station; and
a codebook selection unit configured to select a codebook to be indicated to the base station from the stored codebooks based on the measured channel conditions and instruct the transmission and reception unit to indicate feedback information to the base station, wherein the feedback information includes a codebook index for identifying the selected codebook,
wherein the feedback information identifies a first matrix $W_1$ representing the phase information and the gain information and a second matrix $W_2$ representing the phase information, and the precoding matrix is derived from $W_1W_2$.

2. The user equipment as claimed in claim 1, wherein the first matrix $W_1$ has $G_1X_1$ and $G_2X_2$ in diagonal elements, wherein $G_1X_1$ and $G_2X_2$ are respective products of matrices $G_1$ and $G_2$ representing the gain information and matrices $X_1$ and $X_2$ representing the phase information.

3. The user equipment as claimed in claim 2, wherein the matrices $G_1$ and $G_2$ are diagonal matrices whose diagonal elements represent gain values applied to beams transmitted from the base station.

4. The user equipment as claimed in claim 3, wherein the second matrix $W_2$ indicates a matrix Y for identifying beams transmitted from the base station and a phase shift amount of the multiple antennas.

5. The user equipment as claimed in claim 2, wherein the matrix $X_1$ indicates a broadband or long-term channel quality measured by the channel measurement unit, and the matrix $X_2$ indicates a narrowband or short-term channel quality measured by the channel measurement unit.

6. The user equipment as claimed in claim 2, wherein the matrices $X_1$ and $X_2$ are specified to have successive phase shift amounts for beams transmitted from the base station.

7. A base station comprising:
a transmission and reception unit configured to communicate a radio signal with a user equipment in accordance with MIMO (Multiple Input Multiple Output) transmission;
a precoding weight generation unit configured to derive a precoding matrix based on phase information and gain information identified by a codebook index in feedback information received from the user equipment and generate precoding weights based on the derived precoding matrix; and
a precoding unit configured to generate radio signals for antennas by applying the generated precoding weights to streams transmitted to the user equipment and instruct the transmission and reception unit to transmit the generated radio signals via the corresponding antennas,
wherein the feedback information identifies a first matrix $W_1$ representing the phase information and the gain information and a second matrix $W_2$ representing the phase information and the precoding matrix is derived from $W_1W_2$.

* * * * *